3,254,958
HIGH TEMPERATURE PREPARATION OF CHLORINE FROM HYDROGEN CHLORIDE
Irwin B. Margiloff, New York, N.Y., assignor to Halcon International, Inc., a corporation of Delaware
Filed Sept. 17, 1962, Ser. No. 224,163
3 Claims. (Cl. 23—219)

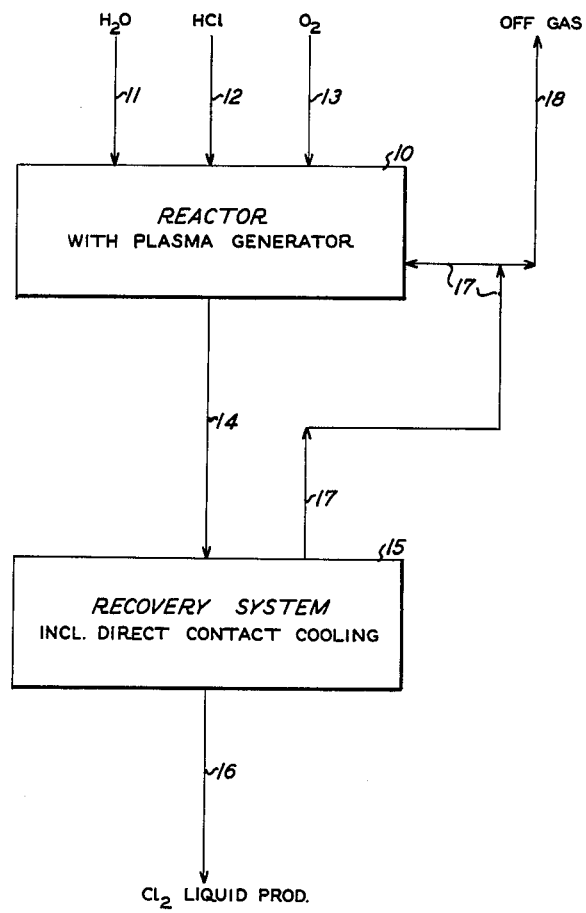

This invention relates to processes for the preparation of chlorine from hydrogen chloride, more particularly to such processes wherein the latter is broken down at high temperatures and the chlorine formed thereby is recovered, and especially to such processes wherein the high temperature is attained by a so called plasma generator wherein water is cracked by means of an electrical arc and the resulting fragments or plasma allowed to recombine with simultaneous generation of the high temperature; oxygen is included in the reaction mixture, and for this the temperature may be about 4500° F.

Chlorine is a commercially available material and may be recovered from hydrogen chloride by oxidation or other processes. However, these leave much to be desired from the economic viewpoint, and the art is confronted with the problem of providing more advantageous processes for the production of chlorine from hydrogen chloride.

The discoveries associated with the invention and relating to the solution of the above problems, and the objects achieved in accordance with the invention as set forth herein include the provision of:

a process for preparing chlorine from hydrogen chloride which comprises cracking water in an arc and allowing the resulting plasma to be reunited in a reactor in the presence of oxygen and hydrogen chloride;

such a process wherein the reactor temperature is about 4500° F.;

such a process wherein the reaction mixture is rapidly quenched with water; and other objects which will be apparent as details or embodiments of the invention are set forth hereinafter.

The acompanying drawing is a schematic illustration of a preferred embodiment of the invention.

In order to indicate still more fully the nature of the present invention, the following example of a typical procedure is set forth in which parts and percents means parts and percents by weight, respectively, unless otherwise indicated, it being understood that this example is presented as illustrative only and is not intended to limit the scope of the invention.

EXAMPLE 1

Referring to the accompanying drawing, one mol of hydrogen chloride and ½ mol of oxygen are introduced via lines 12 and 13 into reactor 10 and raised to a temperature therein of about 4500° F. at a pressure of about one atmosphere by water which is introduced via line 11, and cracked in the plasma generator section of the reactor. The reaction mixture is rapidly cooled by direct contact cooling and for this it may be passed via line 14 to the recovery system 15 which includes the cooling or quench means. Liquid water may be used as the cooling medium. The chlorine in the reaction mixture is separated in known manner, which includes cooling, drying and refrigerated liquefaction. The product is removed via line 16. The unreacted hydrogen chloride and oxygen may be recycled via line 17 to the reactor 10. If desired some or all of this gas may be removed via line 18.

About 45% of the hydrogen chloride is cracked to chlorine at about atmospheric pressure. By recycling the unreacted hydrogen chloride to extinction there is substantially complete conversion thereof to chlorine, and any by-product hydrogen is separated in the separation system.

The procedure of Example 1 is repeated with the omission of oxygen; the reactor temperature for a conversion of 45% is about 5400° F. but the absence of added oxygen provides no stable water molecules into which the hydrogen from the HCl may be incorporated. Consequently the chlorine and hydrogen recombine to form hydrogen chloride.

Comparable results are achieved with various modifications of the foregoing including the following. The oxygen need not be pure; impurities such as nitrogen only increase the cost of power required. Although water plasmas is preferred for economic as well as for process reasons, other suitable materials may be used in place thereof such as nitrogen, air, argon, or the like. When air is used, the oxygen added to the reactor may be partially or totally eliminated. Generally, in order to make the separations more economic, superatmospheric pressures are preferable, broadly in the range of 1 to 15 atmospheres, and desirably 1.5 to 7 atmospheres; however, subatmospheric operations while operable are undesirable. The lowest temperature which achieves the desired chlorine formation reaction is preferred on account of reduced power costs and generally, local gas reaction temperatures from somewhat above 4000° F. up to about 8000° F. may be used. The oxygen introduced with the hydrogen chloride should preferably exceed ½ mol per mol of hydrogen chloride; any excess can be recycled, though generally, large excesses of oxygen are to be avoided as unnecessarily wasteful of power.

The quenching and cooling fluid may be water or a solution of hydrochloric acid, however, other fluids may be used. Generally the quench should be performed shortly after reaction equilibrium is substantially reached to minimize the amount of high temperature equipment, but no harm is done if the quench is delayed. It should, however, be performed rapidly across the temperature interval between the reaction temperature and about 600° F. Thereafter, slower cooling nearly to normal cooling water temperatures may be employed preliminary to drying and liquefaction of the chlorine.

Known apparatus is used for generating the plasma, as well as for effecting the reaction at the desired temperature and for quenching the reaction mixture. Also, the recovery apparatus is well-known.

In view of the foregoing disclosures, variations and modifications thereof will be apparent to one skilled in the art, and it is intended to include within the invention all such variations and modifications except as do not come within the scope of the appended claims.

What is claimed is:

1. A process for preparing chlorine from hydrogen chloride which comprises cracking the latter at elevated temperatures of from about 4000° F. to about 8000° F. in the presence of water plasma, cooling and separating the chlorine therefrom, and recycling unreacted hydrogen chloride to the cracking step.

2. A process of claim 1 wherein the cracking temperature is at about 4500° F.

3. A process of claim 2 wherein the reaction mixture is rapidly quenched with water.

(References on following page)

References Cited by the Examiner

UNITED STATES PATENTS

| | | |
|---|---|---|
| 2,542,961 | 2/1951 | Johnson et al. _____ 23—219 |
| 2,547,928 | 4/1951 | Davis et al. _____ 23—219 |
| 2,819,423 | 1/1958 | Clark. |
| 2,951,143 | 8/1960 | Anderson et al. |
| 3,091,920 | 6/1963 | Motvay. |
| 3,114,691 | 12/1963 | Case. |

BENJAMIN HENKIN, *Primary Examiner.*

MAURICE A. BRINDISI, *Examiner.*

E. STERN, *Assistant Examiner.*